3,793,378
CATALYTIC PROCESS FOR PREPARING META-CRESOL

Luigi Cassar, Marco Foa, and Gian Paolo Chiusoli, Novara, Italy, assignors to Montecatini Edison S.p.A., Milan, Italy
No Drawing. Filed Apr. 15, 1971, Ser. No. 134,506
Claims priority, application Italy, Apr. 16, 1970, 23,392/70
Int. Cl. C07c 37/00
U.S. Cl. 260—621 R  3 Claims

ABSTRACT OF THE DISCLOSURE

A new catalytic process for preparing m-cresol from methallyl chloride, acetylene and carbon oxide is disclosed. The catalyst used is a system prepared from nickel-tetracarbonyl, an alkaline iodide and/or an alkaline bromide, iron powder and thiourea. A neutralizing agent is also present.

Due to the various purposes for which it is useful, meta-cresol has considerable industrial importance. It can be used in the preparation of phenol/formaldehyde type resins, in the preparation of plasticizers (tricresylphosphates), and in the preparation of antioxidants, etc.

THE PRIOR ART

Italian Pat. No. 779,431 describes a method for preparing meta-cresol from methallyl chloride, acetylene and carbon oxide in ketonic solvents and using, as catalyst, nickel carbonyl or a catalytic system prepared from nickel chloride, iron powder and thiourea.

The yields obtained by the process of the Italian patent are relatively low, due to the formation of by-products, such as methylcyclohexanone, methyl-bicyclohexanone, and methyl-dichloromethylpentene.

Production of the by-products results, in turn, in a high rate of catalyst consumption.

THE PRESENT INVENTION

One object of this invention was to provide an improved, simple and cheap process for preparing m-cresol by synthesis from readily accessible raw materials and which is free of the disadvantages and drawbacks of the known processes.

Other objects will appear hereinafter.

According to the invention, meta-cresol is obtained inexpensively and in high yields by reacting methallyl chloride, acetylene and carbon oxide together in contact with a new, and selective, catalyst.

The reaction proceeds according to the following scheme:

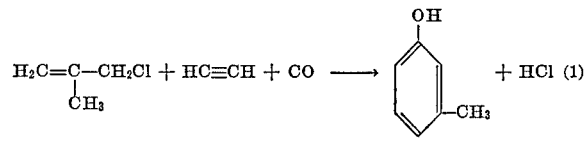

$H_2C=C(CH_3)-CH_2Cl + HC\equiv CH + CO \longrightarrow$ m-cresol $+ HCl$ (1)

The reaction is carried out in a ketonic solvent, at a temperature of from 0° C. to 50° C., and under atmospheric pressure, in contact with a catalyst prepared by mixing nickel-tetracarbonyl with an alkaline iodide and/or alkaline bromide, iron powder and thiourea. A neutralizing agent is included in the reaction medium for neutralizing the hydrochloric acid formed.

Examples of alkaline iodides and bromides which can be used in preparing the catalysts used in the present process include the iodides and bromides of Na, K, $NH_4$, and $NR_4$ in which R is an alkyl radical containing from 1 to 4 carbon atoms, such as KBr, NaI, $Bu_4NI$, and the like.

Preferably, the iron powder used has a granule size such that the powder passes through a screen having more than 5000 meshes per square centimeter.

The ketonic solvent in which the reaction is carried out may be an aliphatic, alicyclic, or aromatic ketone containing from 3 to 13 carbon atoms.

The neutralizing agent comprised in the ketonic reaction medium, for neutralizing the hydrochloric acid formed, may be, for instance, calcium or magnesium oxide or carbonate.

The reaction is generally carried out at room temperature, although temperatures between 0° C. and 50° C. can be used, and at atmospheric pressure.

Instead of using pure methallyl chloride as one starting reactant, there may be used the product obtained by chlorination of the $C_4$ fraction of petroleum cracking, after removal of butadiene from said fraction, and comprising a mixture of chlorides including methallyl chloride.

As presently indicated, the chlorides obtained from butene-1 and butene-2 do not react with acetylene and carbon oxide to form meta-cresol.

In order to obtain the best yields of meta-cresol, using the mixed chlorides resulting from chlorination of the $C_4$ fraction, however, the content of methallyl chloride should be high, and not less than 40% by weight.

The relative quantities of the reagents used in the present process can vary within wide limits. Preferably for each mol of methallyl chloride there are used:

from 10 to 100 moles of ketonic solvent
from 1 to 2 moles of acetylene
from 1 to 2 moles of carbon oxide
from 0.01 to 0.1 mole of nickel-tetracarbonyl
from 0.1 to 1 mole of iron powder
from 0.001 to 0.01 mole of alkaline halide
from 0.001 to 0.01 mole of thiourea
from 0.5 to 1 mole of neutralizing agent In a preferred, but not restrictive, embodiment of the invention, the methallyl chloride is added gradually, and under constant stirring, to the reaction mixture containing the ketonic solvent, the nickel-tetracarbonyl, the alkaline halide, the iron powder, the thiourea, and the neutralizing agent. The addition of the methallyl chloride to the reaction mixture is accompanied by the simultaneous feeding of a flow of acetylene and carbon oxide into the reaction mixture.

After completion of the reaction, the nickel-tetracarbonyl can be reconstituted by the addition to the reaction mixture of small quantities of thiourea and of an Fe-Mn alloy in powder form, and by flowing carbon oxide into the reaction mixture, under stirring, for a period of from two to three hours, at room temperature.

Thereafter, the solvent and the nickel-tetracarbonyl are distilled and then recycled.

The residue is treated with acidulated water, to dissolve the salts, and then extracted with a water-immiscible organic solvent for the m-cresol, such as, for instance, an ether; a chloroalkane such as $CHCl_3$, $CH_2Cl_2$, $C_2H_4Cl_2$; an ester such as ethyl acetate; or a hydrocarbon such as heptane, benzene, toluene, etc.

The resulting organic solvent extract is finally distilled, to recover the solvent and separate the m-cresol.

The method described is presently preferred because of the mild operating conditions and the high yields of m-cresol obtained, compared to prior art processes.

A marked economical advantage of the present process resides in the possibility of using, as one starting reactant, the mixture of chlorides obtained by chlorination of the $C_4$ fraction of conventional petroleum cracking, freed of butadiene prior to the chlorination.

The following examples are given to illustrate the invention and are not intended to be limiting.

EXAMPLE 1

Into a 1 liter flask fitted with a stirrer, a drawing pipe for the feeding of gases, a dripping funnel and a liquid ammonia coolant, there were introduced:

| | |
|---|---|
| Acetone cc | 800 |
| Ni(CO)$_4$, (13 g.) cc | 10 |
| NaI g | 0.9 |
| Fe powder with a granule size of 50,000 meshes/sq. cm. g | 27.5 |
| Thiourea g | 0.3 |
| MgO g | 12 |

A gaseous flow consisting of $C_2H_2$ (5 liters/hr.) and CO (5 liters/hr.) is fed into the flask through the drawing pipe. While maintaining the temperature at between 20° C. and 22° C., 95 g. of 95% methallyl chloride (obtained by chlorination of isobutene) are added to the flask over a period of five hours.

After all of the ingredients have been mixed together, a flow of the gas into the flask is continued for two hours, under stirring.

Thereafter, 2.0 g. of an Fe-Mn alloy (20% Fe; 80% Mn) in the form of a powder, and 0.3 g. of thiourea are added, while flowing in carbon oxide only for another three hours.

By distillation, there were recovered 730 cc. of acetone and 10 g. of nickel-tetracarbonyl. The residue was taken up with 500 cc. of water acidulated with concentrated HCl up to a pH value acid by the litmus paper test and then extracted with ethyl ether (3 times with 100 cc.). The ethereal extract was then distilled under vacuum, thereby obtaining 85 g. of meta-cresol at 98%. The yield was 77% referred to the methallyl chloride used.

EXAMPLE 2

Into equipment as described in Example 1, there were introduced:

| | |
|---|---|
| Acetone cc | 800 |
| Ni(CO)$_4$ cc | 10 |
| NaI g | 0.9 |
| Thiourea g | 0.3 |
| Fe powder with a granule size of 50,000 meshes/sq. cm. g | 27.5 |
| MgO g | 12 |

Maintaining the temperature at between 20° and 22° C., a gas flow of 5 lt./hr. of CO and 5 lt./hr. of $C_2H_2$ is passed through the reaction mixture. Over a period of five hours, there are added 178 g. of the chlorination product of the $C_4$ fraction, containing 51% of methallyl chloride.

After 7 hours, 2 g. of an Fe-Mn alloy in powder form and 0.3 g. of thiourea, are added to the mixture into which a CO flow is passed for another 3 hours.

By distillation of the raw product, there are recovered 8 g. of Ni(CO)$_4$ and 730 cc. of acetone. Thereupon, by operating as in the preceding example, there are recovered 66.5 g. of meta-cresol at 98%. The yield amounted to 60% referred to the methallyl chloride used.

As will be apparent, various changes in detail can be made in practicing this invention without departing from its spirit. Therefore, we intend to include in the scope of the appended claims all such variations and modifications as will be obvious to those skilled in the art from the descriptions and working examples given herein.

What is claimed is:

1. A process for the preparation of m-cresol which comprises reacting methallyl chloride, acetylene and carbon dioxide in acetone at a temperature of from 0° C. to 50° C., under atmospheric pressure, and in contact with a halide selected from the group consisting of the alkaline iodides and bromides of Na, K, NH$_4$ and NR$_4$ in which R is an alkyl radical containing from 1 to 4 carbon atoms, iron powder and thiourea, the acetone containing, also, a neutralizing agent for the hydrochloric acid formed in the reaction resulting from the production of the m-cresol and which neutralizing agent is selected from the group consisting of calcium oxide, magnesium oxide, calcium carbonate and magnesium carbonate.

2. The process according to claim 1, in which the granules of the iron powder pass through a screen having more than 5,000 meshes per square centimeter.

3. The process according to claim 1, in which the mixed chlorides obtained by chlorination of the $C_4$ fraction of petroleum cracking, after removal of butadiene from said fraction, and containing methallyl chloride, are used as one reactant instead of pure methallyl chloride.

References Cited

UNITED STATES PATENTS

| | | | |
|---|---|---|---|
| 2,702,304 | 2/1955 | Reppe | 260—621 R |
| 3,149,138 | 9/1964 | Hubel et al. | 260—621 R |
| 3,546,264 | 12/1970 | Pino et al. | 260—621 R X |

LEON ZITVER, Primary Examiner

N. MORGENSTERN, Assistant Examiner